US009719457B2

(12) United States Patent
Moonjelly et al.

(10) Patent No.: US 9,719,457 B2
(45) Date of Patent: *Aug. 1, 2017

(54) SYSTEM AND METHOD OF DETECTING HYDRAULIC START-OF-INJECTION

(71) Applicant: Cummins Intellectual Property, Inc., Minneapolis, MN (US)

(72) Inventors: Paul V. Moonjelly, Columbus, IN (US); Richard A. Booth, Columbus, IN (US); Lester L. Peters, Columbus, IN (US); Jeffrey C. Huang, Greenwood, IN (US); Phanindra Garimella, Bloomington, IN (US)

(73) Assignee: Cummins Intellectual Property, Inc., Columbus, IN (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/690,648

(22) Filed: Apr. 20, 2015

(65) Prior Publication Data

US 2015/0226149 A1 Aug. 13, 2015

Related U.S. Application Data

(63) Continuation of application No. 13/361,708, filed on Jan. 30, 2012, now Pat. No. 9,010,303.

(Continued)

(51) Int. Cl.
*F02D 41/40* (2006.01)
*F02D 41/00* (2006.01)
(Continued)

(52) U.S. Cl.
CPC ......... *F02D 41/401* (2013.01); *F02D 35/023* (2013.01); *F02D 41/009* (2013.01);
(Continued)

(58) Field of Classification Search
CPC .... F02D 41/401; F02D 41/1439; F02D 41/22; F02D 41/3809; F02D 41/009;
(Continued)

(56) References Cited

U.S. PATENT DOCUMENTS 5,706,780 A * 1/1998 Shirakawa ............ F02D 41/005
123/381
5,718,203 A * 2/1998 Shimada ............... F02D 35/024
123/305

(Continued)

FOREIGN PATENT DOCUMENTS

DE 19749817 12/1999
GB 2331153 12/1999

*Primary Examiner* — Joseph Dallo
(74) *Attorney, Agent, or Firm* — Faegre Baker Daniels LLP

(57) ABSTRACT

This disclosure provides system and method that can determine hydraulic start of injection (SOI) in engines using an in-cylinder pressure sensor. The system and method determine apparent heat release rate (AHRR) curve data for the cylinder from the pressure information provided by the in-cylinder pressure sensors, and the hydraulic SOI from the derivative of the AHRR curve data. The system and method provide diagnostic, control and/or compensation opportunities for fuel injector operation in high pressure fuel rail engine systems without use of expensive or complex fuel injector components.

20 Claims, 7 Drawing Sheets

Related U.S. Application Data

(60) Provisional application No. 61/437,349, filed on Jan. 28, 2011.

(51) Int. Cl.
    *F02D 41/22*     (2006.01)
    *F02D 35/02*     (2006.01)
    *F02D 41/38*     (2006.01)
    *F02D 41/14*     (2006.01)

(52) U.S. Cl.
    CPC ..... *F02D 41/0085* (2013.01); *F02D 41/1439* (2013.01); *F02D 41/22* (2013.01); *F02D 41/221* (2013.01); *F02D 41/3809* (2013.01); *F02D 35/028* (2013.01); *F02D 2041/1432* (2013.01); *F02D 2041/224* (2013.01); *F02D 2041/389* (2013.01); *F02D 2200/0618* (2013.01); *Y02T 10/44* (2013.01)

(58) Field of Classification Search
    CPC .. F02D 41/221; F02D 35/023; F02D 41/0085; F02D 2041/389; F02D 2041/224; F02D 2041/1432; F02D 2200/0618; Y02T 10/44
    See application file for complete search history.

(56) References Cited

U.S. PATENT DOCUMENTS

| | | | | |
|---|---|---|---|---|
| 5,878,723 A * | 3/1999 | Kirschner | | F02D 41/28 123/458 |
| 5,896,845 A * | 4/1999 | Matsuda | | F02B 75/34 123/435 |
| 6,276,334 B1 * | 8/2001 | Flynn | | F02B 19/14 123/435 |
| 6,443,104 B1 * | 9/2002 | Simescu | | F02B 1/12 123/25 C |
| 6,598,468 B2 * | 7/2003 | Zur Loye | | F02D 35/023 73/114.06 |
| 6,722,345 B2 * | 4/2004 | Saeki | | F02D 35/023 123/299 |
| 6,748,928 B2 * | 6/2004 | Shingole | | F02D 41/365 123/480 |
| 7,013,865 B2 * | 3/2006 | Nagai | | F02D 35/023 123/305 |
| 7,133,761 B2 * | 11/2006 | Ancimer | | F02D 35/028 123/435 |
| 7,254,473 B2 * | 8/2007 | Kojima | | F02D 35/023 123/295 |
| 7,296,556 B2 * | 11/2007 | Yamaguchi | | F02D 35/023 123/305 |
| 7,319,930 B2 * | 1/2008 | Dietl | | F02D 41/0085 123/436 |
| 7,392,129 B2 * | 6/2008 | Hill | | F02D 35/02 123/480 |
| 7,401,591 B2 * | 7/2008 | Yamaguchi | | F02D 35/023 123/299 |
| 7,788,017 B2 * | 8/2010 | Nagata | | F02D 35/023 123/406.23 |
| 8,171,914 B2 * | 5/2012 | Atzler | | F02D 35/023 123/435 |
| 8,434,456 B2 * | 5/2013 | Fischer | | F02D 35/023 123/305 |
| 8,437,945 B2 * | 5/2013 | Haskara | | F02D 35/023 123/299 |
| 2003/0131822 A1 * | 7/2003 | Fischer | | F02D 35/023 123/435 |
| 2005/0229903 A1 * | 10/2005 | Kobayashi | | F02D 35/023 123/435 |
| 2005/0247285 A1 * | 11/2005 | Nagai | | F02D 35/023 123/305 |
| 2009/0056678 A1 * | 3/2009 | Nakata | | F02D 41/221 123/480 |
| 2009/0084348 A1 * | 4/2009 | Batenburg | | F02D 35/023 123/294 |
| 2009/0100919 A1 * | 4/2009 | Sugita | | F02D 41/1497 73/114.15 |
| 2009/0178405 A1 * | 7/2009 | Chadwell | | F02B 37/04 60/600 |
| 2010/0037861 A1 * | 2/2010 | Atzler | | F02D 35/023 123/435 |
| 2010/0116249 A1 * | 5/2010 | Guerrassi | | F02D 35/023 123/435 |
| 2010/0242912 A1 * | 9/2010 | Folkerts | | F02D 35/023 123/435 |
| 2010/0326410 A1 * | 12/2010 | Yeh | | C10L 1/04 123/575 |
| 2011/0077846 A1 * | 3/2011 | Zavala Jurado | | F02D 35/023 701/111 |
| 2012/0095668 A1 * | 4/2012 | Landsmann | | F02D 35/023 701/103 |

* cited by examiner

SYSTEM AND METHOD OF DETECTING HYDRAULIC START-OF-INJECTION

CROSS REFERENCE TO RELATED APPLICATIONS

This application is a continuation of U.S. patent application Ser. No. 13/361,708 filed on Jan. 30, 2012, now U.S. Pat. No. 9,010,303, issued on Apr. 21, 2015, which claims benefit of priority to Provisional Patent Application No. 61/437,349 filed on Jan. 28, 2011, the entire contents of both priority applications being hereby incorporated by reference.

FIELD OF THE INVENTION

The invention relates to a system and method for detecting hydraulic start-of-injection (SOI) on an internal combustion engine.

BACKGROUND

Engine systems including a high pressure fuel delivery system utilize a common rail (also known as a high pressure fuel rail, common rail, or accumulator) to accumulate and distribute fuel to fuel injectors at high-pressure while minimizing pressure fluctuations among the injectors. These systems allow for precise control of high-pressure injection of fuel by an engine control module (ECM) or an engine control unit (ECU) into the cylinders of an internal combustion engine at timing that is independent from the engine speed. The ECM/ECU receives an engine speed signal from a sensor and then using its algorithms and look-up calibration tables stored in the ECM/ECU, controls the amount of injected fuel and the timing of injection, called "start of injection" (SOI), through electric or hydraulic actuators to maintain engine speed. Controlling the timing of the SOI of fuel into an engine cylinder is needed to control emissions and fuel economy of the engine system.

The timing of SOI is controlled electronically in most of today's modern engines. Advancing the SOI (i.e., injecting fuel when the piston is further away from top dead center (TDC)) results in higher in-cylinder pressure, temperature, and efficiency, but at the cost of higher emissions of nitrogen oxides (NOx) due to the higher temperatures. Retarding the SOI can causes incomplete combustion and result in higher particulate matter (PM) and unburned hydrocarbon (HC) emissions. The delay time from the point of a commanded (electric) SOI and hydraulic (actual) SOI is useful information for controlling performance, economy and emissions of such engine systems.

SUMMARY

This disclosure provides system and method that can determine hydraulic start of injection (SOI) in engines using an in-cylinder pressure sensor. The system and method determine apparent heat release rate (AHRR) curve data for the cylinder from the pressure information provided by the in-cylinder pressure sensors, and the hydraulic SOI from the derivative of the AHRR curve data. The system and method provide diagnostic, control and/or compensation opportunities for fuel injector operation in high pressure fuel rail engine systems.

In one aspect, a method detects hydraulic SOI timing of a fuel injector following a commanded SOI for each fuel injector fluidly connected to a cylinder of an internal combustion engine. The method includes measuring pressure in a combustion chamber of the cylinder of the internal combustion engine as a function of crankshaft angle, calculating, from the measured pressure, derivative values of the apparent heat release rate (AHRR) of the cylinder as a function of the crankshaft angle, comparing each calculated derivative value with a threshold value indicating heat loss in the cylinder, and determining hydraulic SOI timing of the fuel injector as the crankshaft timing when the derivative value satisfies the threshold value.

In another aspect of the disclosure, an engine system is configured to determine hydraulic SOI timing of fuel injectors utilized in the fuel system of the engine system. The engine system includes an internal combustion engine including an engine block having plural cylinders and respective pistons and a cylinder head covering the cylinders to define a combustion chamber between the top of the piston and a surface of the cylinder head. Each of the combustion chambers is fluidly connected to a fuel injector configured to inject fuel into the combustion chamber in a timed manner and pressure sensor configured to sense a pressure in the combustion chamber and generate a signal indicative of the sensed pressure. A crankshaft is coupled to each piston and configured to cause each piston to move in a reciprocal motion by angular rotation thereof. The engine system includes a controller having a pressure determining module configured to receive the signal indicative of pressure in each of the combustion chambers as a function of crankshaft angle, an apparent heat release rate (AHRR) curve data determining module configured to determine AHRR curve data based on the measured pressure, a derivative calculating module configured to calculate derivative values of the AHRR data of the cylinder as a function of the crankshaft angle, and a comparing module configured to compare each calculated derivative value with a threshold value indicating heat loss in the cylinder and determine hydraulic SOI timing of the fuel injector as the crankshaft timing when the derivative value satisfies the threshold value.

BRIEF DESCRIPTION OF THE DRAWINGS

FIG. 5A is a graph showing raw AHRR curve data over a partial angular range of the engine crankshaft and the AHRR curve data after smoothing over the same partial angular crankshaft range; FIG. 5B is a graph of the time derivative of the smoothed AHRR curve data; and FIG. 5C is a graph of the needle lift over the partial angular range of the engine crankshaft.

DETAILED DESCRIPTION

Embodiments described herein are directed to a system and method of detecting hydraulic start-of-injection (SOI) on internal combustion engines equipped with in-cylinder pressure sensors. Various aspects are described hereafter in connection with exemplary embodiments to facilitate an understanding of the disclosure. However, the disclosure is not limited to these embodiments. Descriptions and depictions of well-known functions and constructions may not be provided for clarity and conciseness.

The inventors realized that hydraulic SOI timing relative to commanded (electrical) SOI timing is generally not known during normal engine operation unless a custom instrumented injector is used, such as an injector including a lift sensor. Information about hydraulic SOI can be an indicator of injector health, which can influence fueling accuracy, especially at low fueling levels. Also, drift in the hydraulic SOI can adversely affect combustion phasing. The system and method disclosed herein can determine hydraulic SOI timing without the need for specialized needle lift fuel injectors by utilizing an in-cylinder pressure sensor. The hydraulic SOI information thus determined can then be used for diagnostic evaluation and feedback control/compensation opportunities in a high pressure common rail fuel system.

Figure 1:
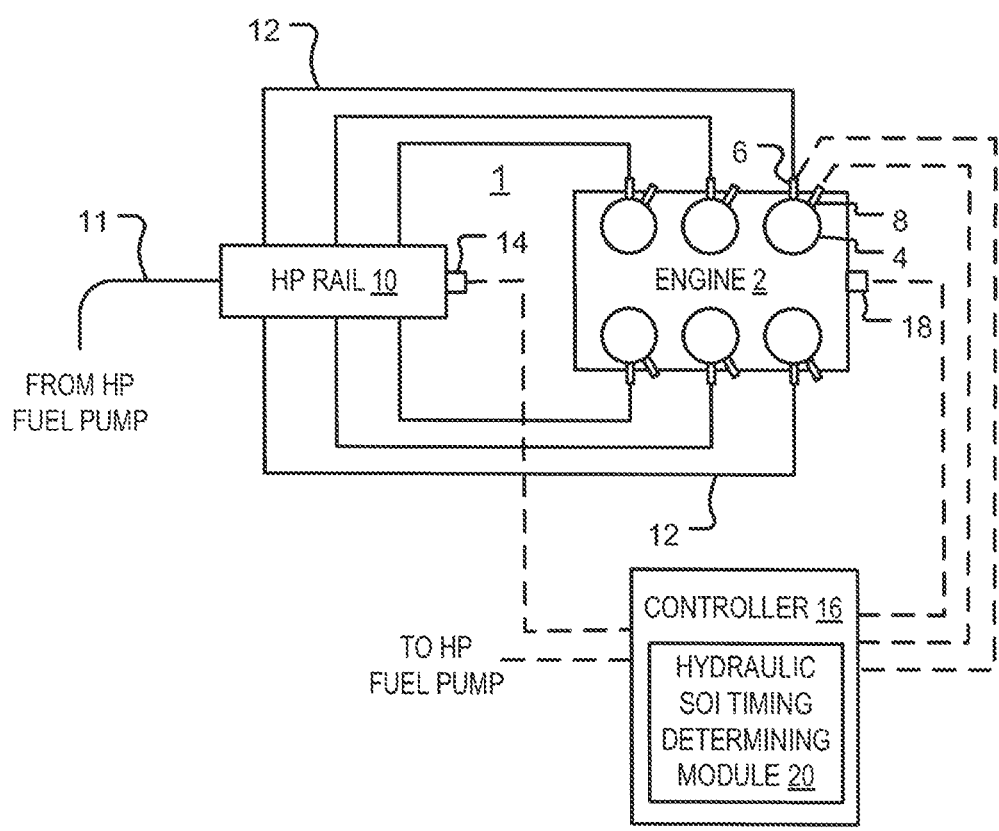
FIG. 1 is a diagram of an engine system including a hydraulic SOI timing determining module according to an exemplary embodiment.

FIG. 1 is a diagram of an engine system 1 including a hydraulic SOI timing detection system according to an exemplary embodiment. As shown in FIG. 1, engine system 1 includes an internal combustion engine 2 including an engine block having plural cylinders 4, each having a respective piston (not shown). The cylinders of the engine block are covered and sealed with a cylinder head (not shown) having a surface that, together with the cylinder sidewalls, defines a combustion chamber of the cylinder 4. The cylinder head of the engine 2 includes a fuel injector 6 configured to inject an atomized fuel spray into the cylinder 4 combustion chamber at a determined timing corresponding to a position of the engine crankshaft (not shown) and duration corresponding to fueling quantity. A combustion chamber pressure sensor 8 also fluidly communicates with the combustion chamber and is configured to sense pressure in the combustion chamber and generate a signal indicative of that pressure. For purposes of clarity in the illustrated engine system 1 of FIG. 1, only one of the plural cylinders 4, fuel injectors 6, and combustion chamber pressure sensor 8 include reference labels.

The fuel system of engine system 1 includes a high pressure (HP) rail 10 fluidly connected downstream to a HP pump (not shown) via high pressure fuel line 11. The HP rail 10 is fluidly connected to each fuel injector 6 via a high pressure fuel lines 12, and is provided with a rail pressure sensor 14 configured to generate a signal indicative of the pressure of fuel in the HP rail 10. A crankshaft angle sensor 16 is provided with the engine 2 and is configured to sense the angular position of the crankshaft and generate a signal indicative of that sensed angular position. Each of the signals generated by the combustion chamber pressure sensors 8, the rail pressure sensor 14, and the crankshaft angle sensor 16 are communicated to a controller 16, which includes a processor, for example, a microprocessor that is configured to processes the received signals.

As shown in FIG. 1, the controller 16 includes a hydraulic SOI timing determining module 20 configured to determine SOI for each of the fuel injectors 6 in a manner described hereafter. While not shown in FIG. 1, the engine system 1 can include an air handling system including an energy conversion device, such as a turbocharger (e.g., variable geometry turbocharger), an intake manifold, and exhaust gas recirculation (EGR) system, an exhaust system including an exhaust manifold and exhaust aftertreatment system for controlling emissions, and other devices and systems.

The controller 16 can be an engine control unit (ECU) or engine control module (ECM) that controls various elements of the engine system 1 including the timing duration and phasing of the fuel injectors 6, or another controller. While not shown, controller 16 can be communicatively connected with other components of the engine system, such as the HP fuel pump, an EGR system (not shown), and an exhaust aftertreatment system (not shown) in a known manner to monitor and control various engine system functions. Further, many aspects of this disclosure are described in terms of sequences of actions to be performed by elements of the hydraulic SOI timing determining module 20 of controller 16, which can be embodied in a controller of an engines system, such as the ECM/ECU, or in a controller separate from, and communicating with an ECU/ECM and/or another network system, other computer system, or other hardware capable of executing programmed instructions. In an embodiment, the controller 16 is an ECM that is part of a CAN (controller area network) in which the controller 16, sensors, actuators of the engine system 1 communicate via digital CAN messages.

It is to be recognized that in each of the embodiments, the various actions could be performed by modules, which can be specialized circuits (e.g., discrete logic gates interconnected to perform a specialized function), program instructions, such as program modules, being executed by one or more processors (e.g., a central processing unit (CPU) or microprocessor), or by a combination of both, all of which can be implemented in a hardware and/or software of the ECM and/or other controller or plural controllers. For example, in an embodiment the hydraulic SOI timing determining module 20 includes plural modules and is part of the controller 16 (e.g., an ECU/ECM). In another embodiment, the hydraulic SOI timing determining module 20 can be implemented as a module separate from, but communicating with the controller 16. In yet another embodiment, the functions performed by the hydraulic SOI timing determining module 20 can be distributed across modules contained in the controller 16, and/or in plural modules separate from the controller 16. Logic of the modules can be implemented with any type of appropriate hardware and/or software, with portions residing in the form of computer readable storage medium with a control algorithm recorded thereon such as the executable logic and instructions disclosed herein, and can be programmed, for example, to include one or more singular or multi-dimensional engine look-up tables and/or calibration parameters. The computer readable medium can comprise tangible forms of media, for example, a random access memory (RAM), a read-only memory (ROM), an erasable programmable read-only memory (e.g., EPROM, EEPROM, or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

Figure 2:
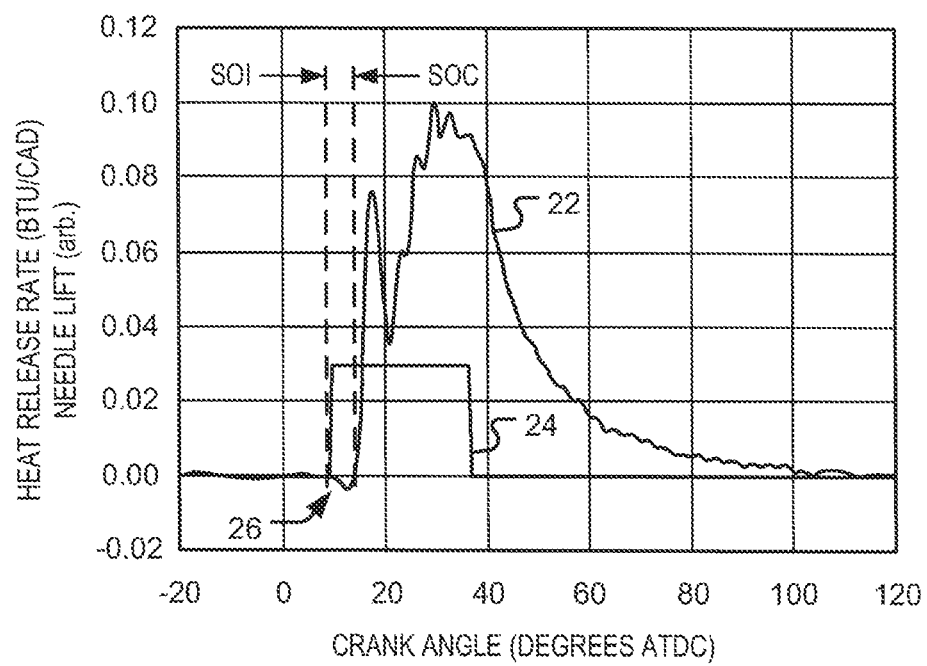
FIG. 2 is a graph showing computed apparent heat release rate (AHRR) data and fuel injector needle lift over a partial angular range of an engine crankshaft.

The hydraulic SOI timing determining module 20 samples and records the cylinder pressure signal from each combustion chamber in-cylinder pressure sensor 8 at a high rate for a brief duration starting with the electrical (commanded) SOI and ending with the electrical end-of-injection (EOI). The sampling rate is selected such that it ensures the desired output resolution. The corresponding crank tooth interrupt time stamps are determined from the crankshaft angle sensor 16 and are also recorded and are used to calculate the instantaneous volume matching up with each pressure sample. FIG. 2 is a graph of an apparent heat release rate (AHRR) curve 22 as a function of crank angle during an FTP B75 operating condition, which was obtained from the pressure and volume information using known equations. The sampled pressure data can be filtered to smooth the data. FIG. 2 also shows the injection rate curve 24 from the needle lift of a needle lift instrumented injector.

The AHRR curve can be determined using the pressure information provided by the combustion chamber pressure sensors 8. Crankshaft angle stamp is used to calculate the instantaneous volume V (equations given below). Instantaneous volume (V) and pressure (P) information is processed using the heat release equation (e.g., see "Internal Combustion Engine Fundamentals" by Heywood) to obtain the Apparent Heat Release Rate (AHRR) indicated by dQ/dt. The instantaneous cylinder volume is defined by:

$$V = V_c + \frac{\pi B^2}{4}(L + R - x), \text{ and} \quad (1)$$

$$x = R(\cos\theta) + \sqrt{L^2 - R^2\sin^2\theta}, \quad (2)$$

where θ is crankshaft angle stamp, L is the connecting rod length, R is the throw, $V_c$ is the clearance volume, B is the cylinder bore diameter, and x is the position of the piston pin from the crankshaft center. The AHRR is given by the following equation:

$$\frac{dQ}{dt} = \frac{\gamma}{\gamma - 1} P \frac{dV}{dt} + \frac{1}{\gamma - 1} V \frac{dP}{dt}, \quad (3)$$

where P is smoothed pressure data, V is the volume obtained from (1) (corresponding to the instantaneous crankshaft angle stamp), γ is the ratio of specific heats (Cp/Cv).

The method of determining SOI focuses on the region 26 of the AHRR curve 22 before the start-of-combustion (SOC) where a slight heat loss (cooling) is observed. In region 26, vaporization of the injected fuel and heating up of the fuel mass contributes to the cooling effect. The hydraulic SOI corresponds to the point in the AHRR curve 22 where the slope starts going negative due to the instantaneous heat loss. This point is shown in FIG. 2 as at the point where the dotted line "SOI" for crank angle between 0 and 20 deg crosses the AHRR curve 22 and was detected by applying a suitable method, for example, in this case by applying a derivative threshold on the AHRR curve 22. For example, the time or crank angle at which the derivative of the AHRR curve 22 crosses a small negative threshold is considered the hydraulic SOI for that injection event in the case of the derivative threshold method. Knowing the crankshaft angle of the commanded (electrical) SOI and crankshaft angle at hydraulic SOI for example, by the crankshaft timestamps at the time of these events, the delay in crankshaft angle can be determined, and the delay time in seconds between commanded SOI and hydraulic SOI can be determined from the crankshaft angular delay and the engine speed (rpm).

The hydraulic SOI for a large number of injection events can be detected as explained above and used in a moving average filter to suppress the effect of measurement errors. The engine system 1 can run this method during normal engine operation (e.g., on production engines equipped with in-cylinder pressure sensors) with a duty-cycle that is frequent enough to capture the SOI drift of the injectors. The effect of SOI drift on combustion phasing can be compensated for by moving the commanded (electrical) SOI in time or angle by an appropriate amount. The effect of the same on low fueling quantities can be compensated for by applying an adaptive correction to the output of a predetermined fueling relationship, for example, from an output of a fueling-to-ontime (FON) mapping/table. Thus, the system and method disclosed herein can help prevent fuel system variations from affecting the engine system 1.

The technique of determining hydraulic SOI disclosed herein provides a way to detect hydraulic SOI on production engines equipped with in-cylinder pressure sensors without using expensive needle lift instrumented injectors. This method takes a novel approach in that it decouples the hydraulic SOI point from the SOC point (which is well established in heat release analysis), thereby providing a means to compensate at the fuel subsystem level as opposed to compensating at the engine system level.

This technique provides feedback on hydraulic SOI delay which is an indicator of both injector performance and health. Small drifts in hydraulic delay can be compensated for with a change in commanded SOI, and the nominal fuel system response/behavior can be maintained through the life of the injector. The same technique can also reduce the effect of injector-to-injector variations on the engine system, and can be utilized early in the life of the engine system 1 (e.g., from the beginning). The system and method also can allow for using detected abnormal or excessive drifts in the hydraulic delay to detect and/or flag injector hardware problems before they fail completely.

Hydraulic SOI delay can significant affect fueling accuracy, most particularly at low fueling levels. The disclosed system and method can therefore be used as a compensation technique and mechanism for identifying and addressing fueling drifts in the low-fueling region. For example, the output of a FON mapping function/table can be adapted to accommodate for the direction and magnitude of SOI delay shift. This is also applicable to reducing injector-to-injector fueling variations by maintaining injector specific trims/corrections that evolve with engine time.

The different feedback/compensation methods described above also can contribute to the potential elimination of the end-of-line (EOL) bar-coding of injectors as the injector-to-injector variations are detected and compensated during normal engine operation in an adaptive fashion. From a systems engineering view point, the ability to decouple SOI from SOC makes it possible to compensate for fuel system variations at the subsystem level as opposed to at the engine level which minimizes the effects of interactions.

Figure 3:
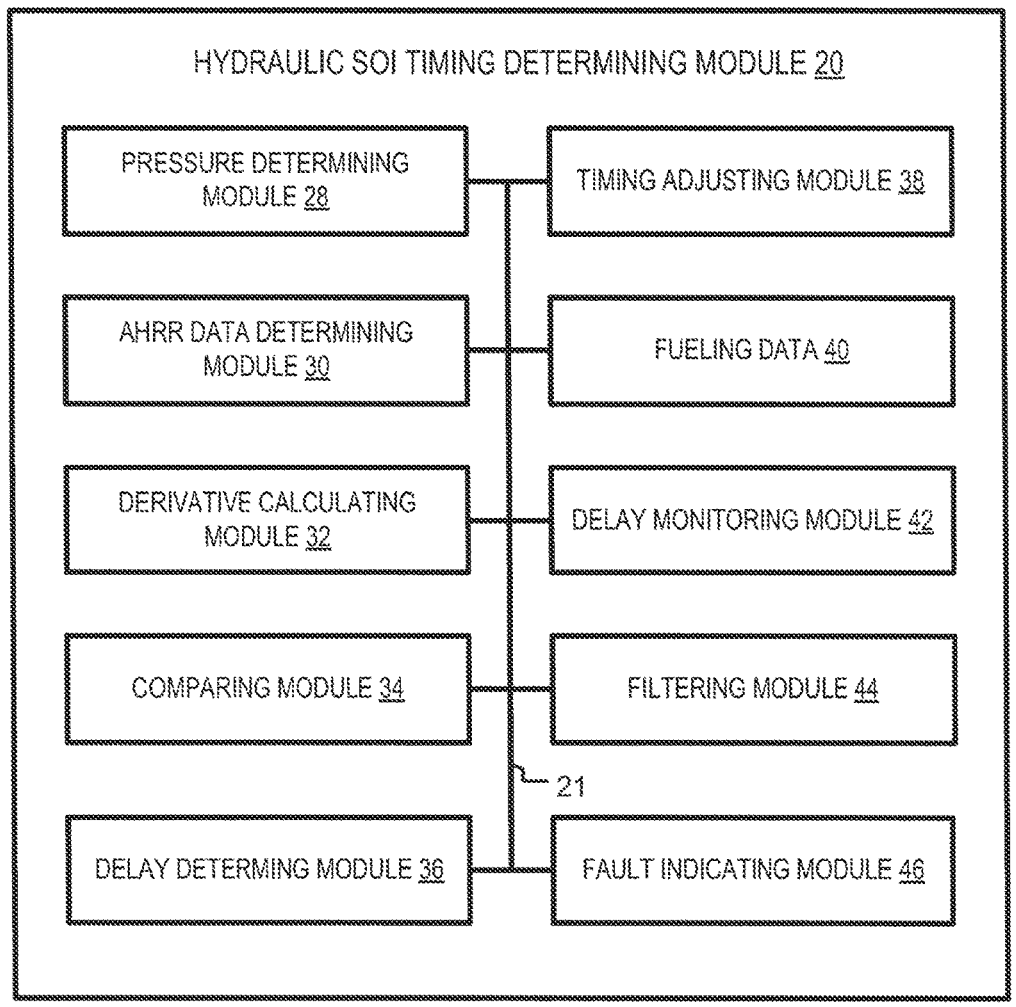
FIG. 3 is a diagram of an exemplary network system layout and modules of the hydraulic SOI determining module shown in FIG. 1.

FIG. 3 shows a more detailed diagram of the submodule logic of the hydraulic SOI timing determining module 20 according to an exemplary embodiment. The component modules of the hydraulic SOI timing determining module 20 communicate with components the controller 16 (e.g., ECU) (not shown) and/or one another via a network 21, which can be, for example, a controller area network (CAN) or another network. As shown in FIG. 3, for each cylinder and corresponding fuel injection, the hydraulic SOI timing determining module 20 includes a pressure determining module 28 configured to receive signals provided by the combustion chamber pressure sensor 8 indicative of pressure in the cylinder combustion chamber as a function of crankshaft angle. The pressure determining module 28 samples pressure in the cylinder combustion chamber across a sweep of crankshaft angle at a rate corresponding to a desired or required resolution. The sampled pressure values, and other parameters and characteristics determined by the hydraulic SOI timing determining module 20, can be recorded into memory accessible by the hydraulic SOI timing determining module 20 and/or by other modules of the engine system 1. An apparent heat release rate (AHRR) curve data determining module 30 is configured to determine AHRR curve data based on the pressure sampled by the pressure determining module 28. A derivative calculating module 32 is configured to calculate derivative values as a function of the crankshaft angle of the AHRR curve data of the cylinder determined by the AHRR curve data determining module 30. A comparing module 34 is configured to compare each calculated derivative value calculated by the derivative calculating module 32 with a threshold value indicating heat loss in the cylinder and determine hydraulic SOI timing for the corresponding fuel injector as the crankshaft timing when the derivative value satisfies the threshold value.

The embodiment shown in FIG. 3 has additional modules that can be included in the hydraulic SOI timing determining module 20. A delay determining module 36 is configured to determine an amount of delay between the determined hydraulic SOI timing and a timing of the commanded SOI. A timing adjusting module 38 can be provided for adjusting a timing of the commanded SOI of the injector by an amount corresponding to the delay amount. The timing adjusting module is configured to adjust the timing of a command timing value output from a fueling mapping or table so the injector performs within an acceptable or optimal range. The adjustment can move the commanded (electrical) SOI in a direction (i.e., forward or backward in time or crankshaft angle) and magnitude based on the detected delay determined by the delay determining module to accommodate for detected delay outlying an acceptable range. The timing adjusting module 38 can act to reduce the injector-to-injector fueling variations by maintaining injector specific trims/corrections that evolve over time. The hydraulic SOI timing determining module 20 includes fueling data 40, for example, fueling tables or maps (e.g., FON maps/tables) from which the timing adjustment module obtains a predetermined fueling command output for adjustment. The fueling maps can be obtained from, for example, memory of the controller 16 or from storage elsewhere in the system network 21 or from remote storage. While the embodiment of FIG. 3 shows fueling data 40 provided with the hydraulic SOI timing determining module 20 (e.g., as part of the ECU), other embodiments can access fueling data from another module or storage accessible by the timing adjusting module 38.

The hydraulic SOI timing determining module 20 can include a delay monitoring module 42 that is configured to monitor the delay amounts determined by the delay determining module 36 over time to detect drift in delay amounts satisfying a predetermined drift threshold value. For each fuel injector for which a detected delay amount drift satisfies the predetermined drift threshold value, the delay monitoring module 42 can be configured to adjust a timing of commanded SOI for that fuel injector to compensate for the detected drift amount. It is to be appreciated that the functions of some submodules of the hydraulic SOI timing determining module 20 can be combined, such as the delay determining module 36 and the delay monitoring module 42 into a single module performing multiple functions.

The hydraulic SOI timing determining module 20 can also include a filtering module 44 configured to process signals determined by modules of the in the hydraulic SOI timing determining module 20. For example, the hydraulic SOI for a large number of fuel injection events can be detected, stored, and used in a moving average filter to suppress the effect of measurement errors or other noise. In an embodiment, the filtering module 44 includes a smoothing filter that can process raw AHRR curve data determined by the AHRR data determining module 30 prior to providing the smoothed data to the derivative calculating module 32 to minimize or reduce noise in the derivative calculation. It is to be understood that the filtering processes performed by filtering module 42 can be performed by individual modules or by other modules of the hydraulic SOI timing determining module 20, for example, a module calculating or determining data to be filtered.

The hydraulic SOI timing determining module 20 can also include a fault indicating module 46 configured to detect abnormal or excessive drifts in hydraulic SOI delay by comparing a determined amount of delay or drift with a fault threshold, which can be a determination of whether a delay threshold value is exceeded or is an outlier of a range; and generate a fault indication, for example, a flag, code or alarm if the delay amount satisfies the fault threshold.

Figure 4:
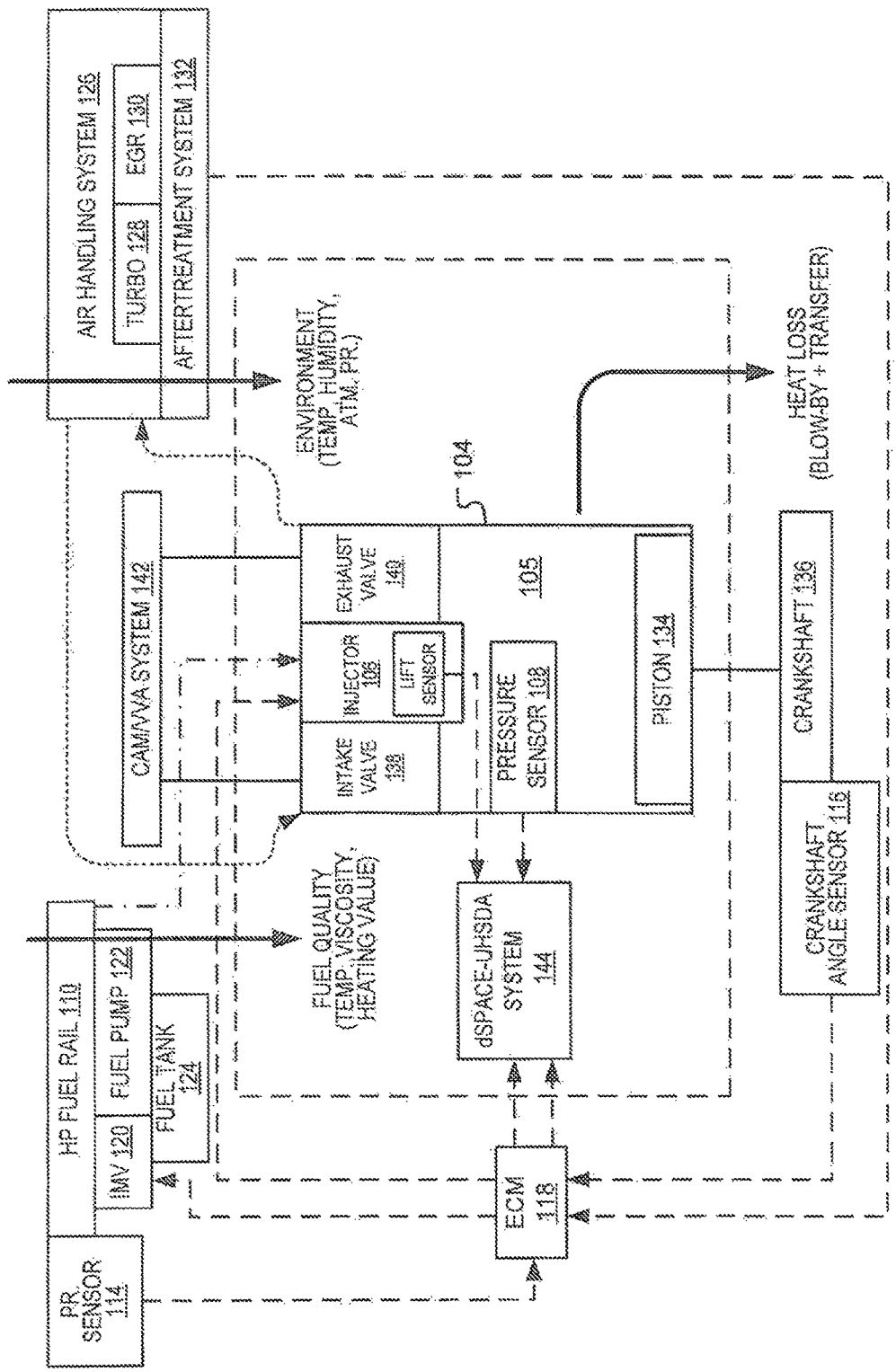
FIG. 4 is a block diagram of a test system used test to verify whether SOI detected from cylinder pressure data sufficiently matches with needle lift over a range of SOI commands. The test system shown in FIG. 4 used a needle lift injector strictly for reference and validation purposes.

FIG. 4 is a schematic diagram of a test system 100 that was used to collect data of a 4.5 L I-4 engine (derived from the Equinox platform) equipped with cylinder pressure sensors in all four cylinders for proof-of-concept testing. The test system 100 used a Bosch CRIN 3.0 fuel system. The fuel system included a high pressure fuel rail 110, a fuel rail pressure sensor 114, an inlet metering valve (IMV) 120, a fuel pump 122, a fuel tank 124, and a specially instrumented needle lift injector 106, which was installed in one cylinder 104 strictly for validation purposes. The needle lift signal provided by the specially instrumented needle lift injector 106 served as an SOI reference in the proof-of-concept stage and this technique is meant to replace the need for such instrumentation once it is mature. The test system 100 also included an air handling system 126 having an turbocharger 128, an EGR system 130 and an exhaust aftertreatment system 132. The cylinder 104 includes a combustion chamber 105 above a piston 134 movable by crankshaft 136, a combustion chamber pressure sensor 108, and an intake valve 138 and exhaust valve 140 controlled by a cam/variable valve actuator (VVA) system 142. A crankshaft angle sensor 116 is provided to indicate the angular position of the crankshaft 136. Also in FIG. 4, solid lines between elements represent transfer of force and/or touching between elements, dashed lines represent power, signal and/or control signals lines, dotted lines represent air or exhaust gas flow, and the dashed-dot line represents fuel flow.

A dSPACE-UHSDA combination system 144 was used to obtain the sampling throughput needed for this application, for example, from the combustion chamber pressure sensor 108 and lift sensor of fuel injector 106. The effects of external factors on this method are depicted in FIG. 4 with thick arrows. These effects were controlled by selecting favorable baseline operating conditions (e.g., no EGR, turbine bypass valve closed, VVA disabled, fuel rail pressure locked, only main pulse, constant speed and load etc.).

Figure 5A:
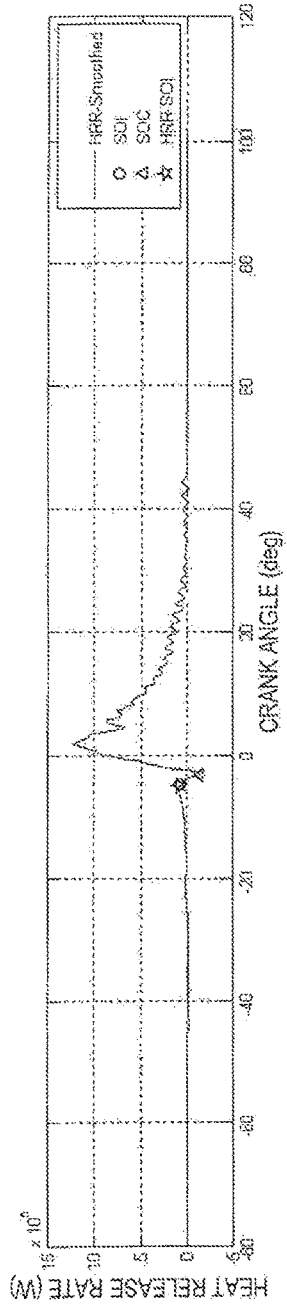
FIGS. 5A-5C show processing of sample pressure signal to determine hydraulic SOI according to the test system of FIG. 4.
Figure 5B:
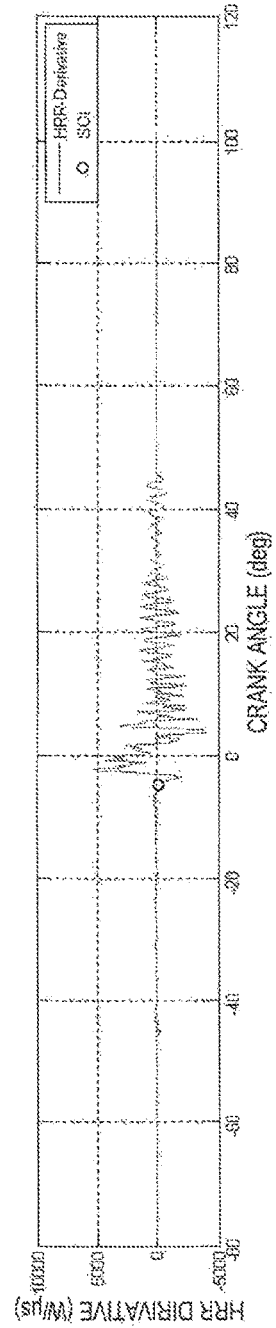
Figure 5C:
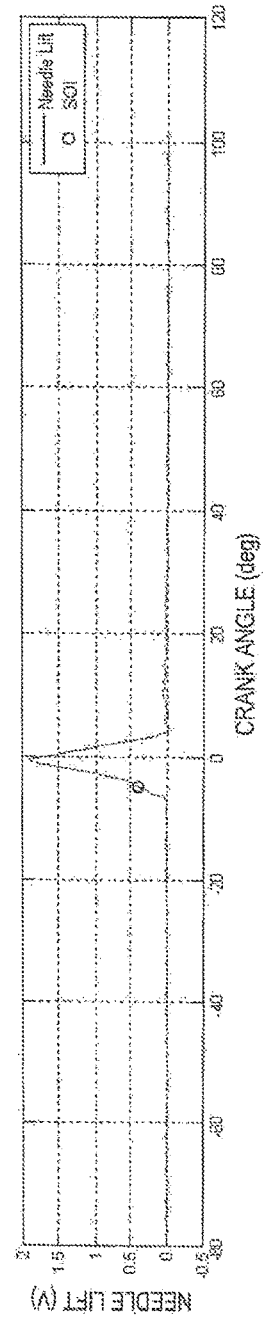

The data obtained from the above-mentioned setup was processed to determine the hydraulic SOI information. FIGS. 5A to 5C respectively show the heat release rate (AHRR), the derivative (slope) of the heat release rate used to apply the detection threshold, and the needle lift signal corresponding to one injection event at 1500 rpm, 25% load, 0% EGR, main pulse only, −8 deg SOI, and 1200 bar rail pressure. FIG. 5A shows the AHRR curve after smoothing the raw AHRR data via a smoothing filter. Smoothing was performed to minimize noise in the derivative calculation. For example, a Savitzky-Golay filter, averaging filter, a low pass filter, or another smoothing technique can be used to smooth the calculated AHRR data. The trace in FIG. 5B is the time derivative of the smoothed AHRR curve. The point at which the red curve (derivative) crossed the negative threshold is the hydraulic SOI obtained from heat release which is marked on the curve. It is also marked as a 'star' on the heat release curve in FIG. 5A. The trace in FIG. 5C is the needle lift signal and the hydraulic SOI point indicated by the needle lift threshold is indicated by the red 'bubble' on the curve. It can be observed from FIG. 5A that the depicted 'star' corresponding to the SOI picked up from heat release is right on the 'bubble' corresponding to needle lift SOI indicating that both SOI points agree.

Figure 6:
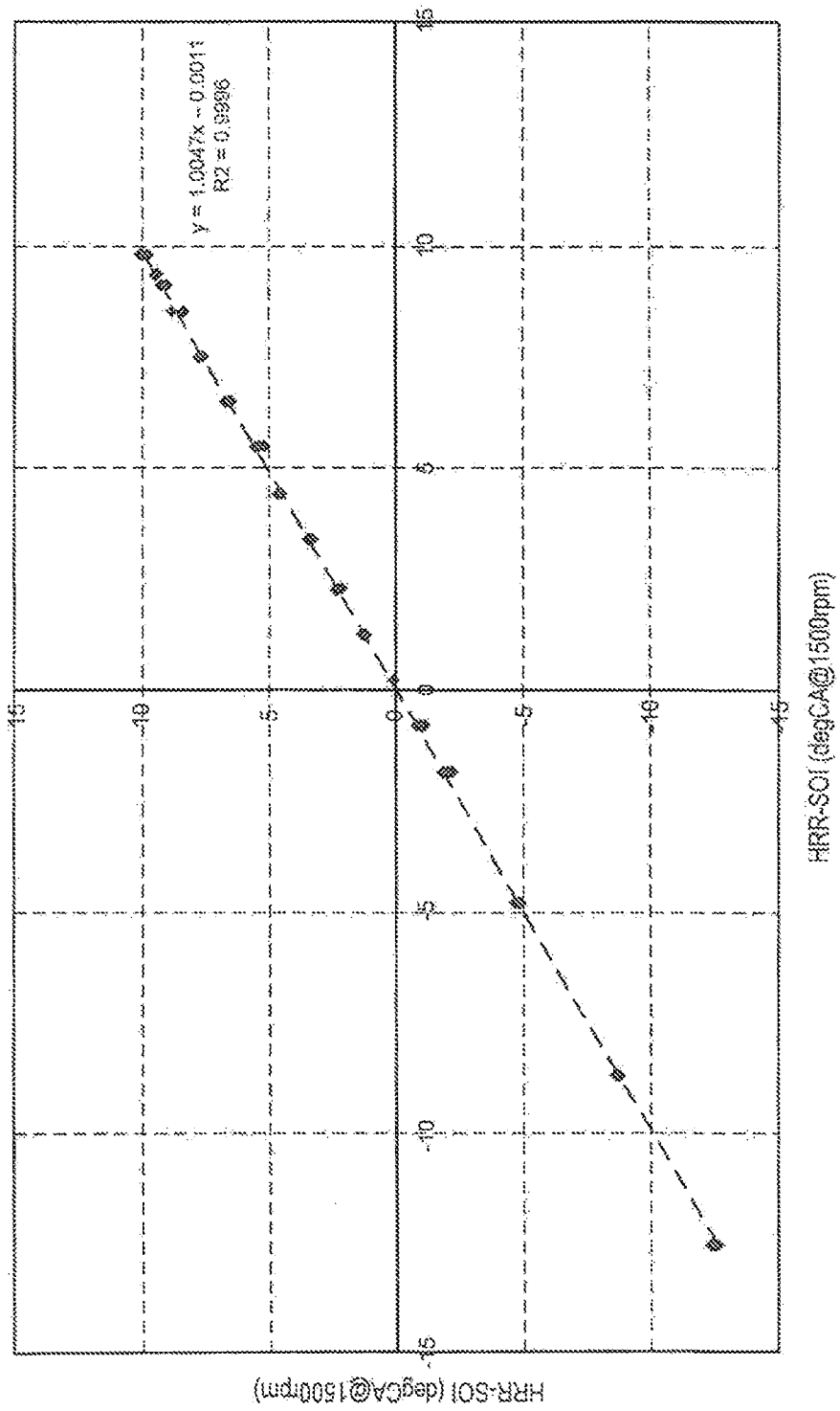
FIG. 6 is a scatter plot of needle lift SOI versus AHRR based SOI for SOI sweep test.

FIG. 6 is a scatter plot of needle lift SOI versus AHRR based SOI for an SOI sweep test, where commanded SOI was swept through a range of values around the top dead center (TDC) holding all other parameters at baseline values to test whether SOI detected from cylinder pressure data matches with needle lift over the range of SOI commands. As can be seen from FIG. 6, the plotted data show the hydraulic SOI picked up from the AHRR curve has good correlation with the SOI indicated by the needle lift signal over the whole range of SOI values.

Figure 7:
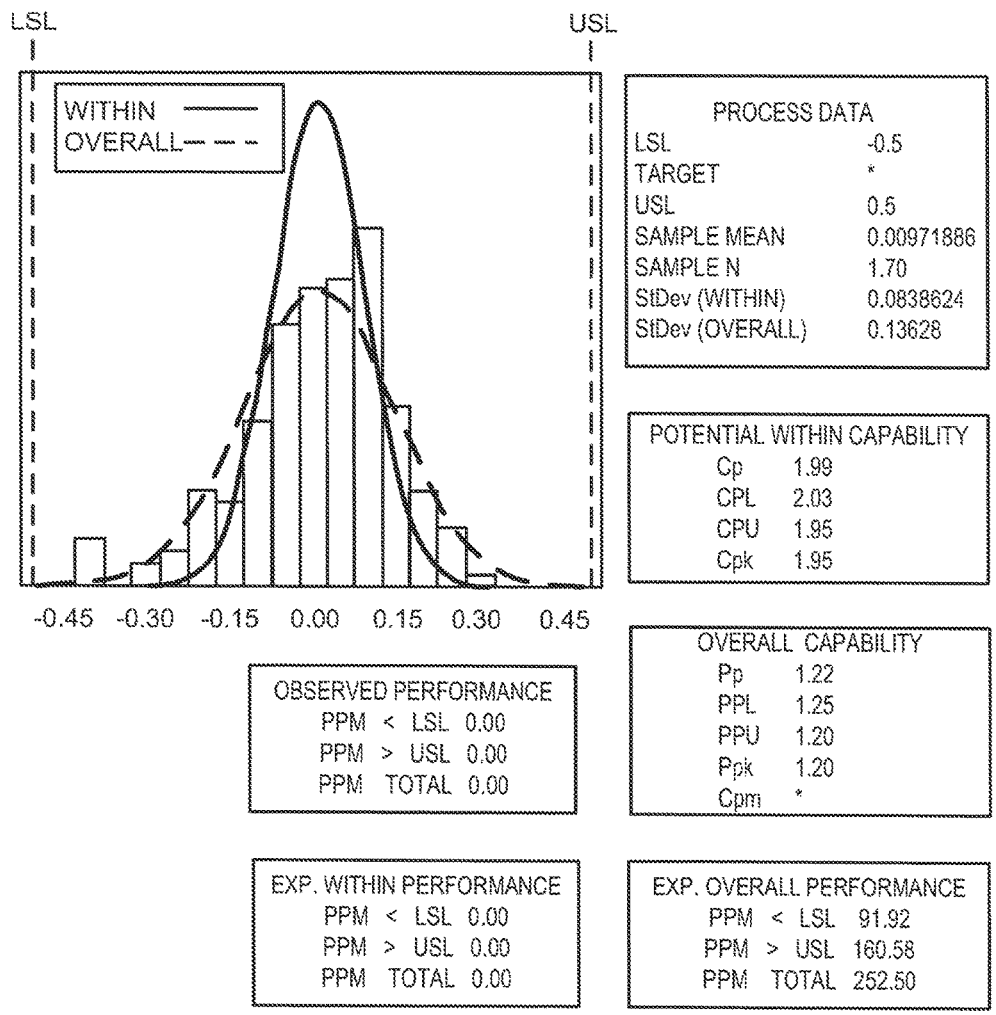
FIG. 7 shows a capability analysis on AHRR based hydraulic SOI prediction error for SOI sweep test.

FIG. 7 shows the results from a capability analysis on the above data using specification limits of +/−0.5 deg crank angle (at 1500 rpm) for SOI prediction error (where Error=Needle Lift SOI−AHRR based SOI). Ppk value of 1.2 indicates decent capability for shot-to-shot SOI measurement (as opposed to mean of 100 shots which should be even better).

The hydraulic SOI for a large number of injection events can be detected, as explained above, and can be used in a moving average filter to suppress the effect of measurement errors. In an embodiment, a moving average can be run during normal engine operation on engines equipped with in-cylinder pressure sensors with a duty-cycle that is frequent enough to capture the SOI drift of the injectors. Small drifts in hydraulic delay can be compensated for with a change in commanded electrical SOI (commanded SOI), and the nominal fuel system response/behavior can be maintained through the life of the injector. The same technique can also reduce the effect of injector-to-injector variations on the engine system, from the time of production and at any point during the life of the engine system. Abnormal or excessive drifts in the hydraulic delay can be used to detect/flag injector hardware problems before they fail completely. The hydraulic SOI delay affects fueling accuracy, and prominently so at low fueling levels. Embodiments according to the present disclosure can therefore be used to compensate for fueling drifts in the low-fueling region, for example, by adapting or adjusting the output of the FON mapping function/table to accommodate for the direction and magnitude of SOI delay shift. This also can be applicable to reducing injector-to-injector fueling variations by maintaining injector specific trims/corrections that evolve with engine time.

The different feedback/compensation methods mentioned above also contribute to the potential elimination of EOL bar-coding of injectors as the injector-to-injector variations are detected and compensated during normal engine operation in an adaptive fashion. From a systems engineering view point, the ability to decouple SIO from SOC makes it possible to compensate for fuel system variations at the subsystem level as opposed to at the engine level which can minimize the effects of interactions.

Although a limited number of embodiments is described herein, one of ordinary skill in the art will readily recognize that there could be variations to any of these embodiments and those variations would be within the scope of the disclosure.

What is claimed is:

1. A method comprising:
   determining derivative values of an apparent heat release rate (AHRR) of a cylinder of an internal combustion engine as a function of a crankshaft angle of the internal combustion engine;
   comparing each of the derivative values with a threshold value indicating heat loss in the cylinder;
   determining hydraulic start-of-injection (SOI) timing of a fuel injector fluidly coupled with the cylinder when a derivative value from the derivative values satisfies the threshold value; and
   utilizing the hydraulic SOI timing to control the fuel injector.

2. The method of claim 1, further comprising:
   receiving a cylinder pressure signal; and
   utilizing the cylinder pressure signal to determine the AHRR of the cylinder.

3. The method of claim 1, further comprising:
   determining a delay amount between the hydraulic SOI timing and a commanded SOI timing; and
   adjusting the commanded SOI timing by an amount corresponding to the delay amount.

4. The method of claim 3, wherein adjusting the commanded SOI timing is performed on a command timing value output from one of a fueling mapping and a table.

5. The method of claim 1, further comprising:
   determining a delay amount between the hydraulic SOI timing and a commanded SOI timing;
   detecting a drift in the delay amount; and
   adjusting the commanded SOI timing to compensate for the drift when the drift exceeds a predetermined drift threshold value.

6. The method of claim 1, further comprising:
   determining a delay amount between the hydraulic SOI timing and a commanded SOI timing; and
   generating a fault indication if the delay amount exceeds a delay threshold value.

7. An engine controller for an internal combustion engine, the controller comprising:
   a derivative calculating module structured to determine derivative values of an apparent heat release rate (AHRR) of a cylinder as a function of a crankshaft angle; and
   a comparing module structured to compare the derivative values with a threshold value indicating heat loss in the cylinder and to determine a hydraulic SOI timing of a fuel injector fluidly coupled with the cylinder when a derivative value from the derivative values satisfies the threshold value.

8. The engine controller of claim 7, further comprising:
   a pressure determining module structured to receive pressure signals of pressure in a combustion chamber and determine combustion chamber pressure values as a function of crankshaft angle.

9. The engine controller of claim 8, further comprising:
an AHRR curve data determining module structured to determine the AHRR of the cylinder based on the combustion chamber pressure values.

10. The engine controller of claim 7, further comprising:
a delay determining module structured to determine a delay amount between the hydraulic SOI timing and a commanded SOI timing; and
a timing adjusting module structured to adjust the commanded SOI timing by an amount corresponding to the delay amount.

11. The engine controller of claim 10, wherein the timing adjusting module adjusts the commanded SOI timing by adjusting a command timing value output from one of a fueling mapping and a table.

12. The engine controller of claim 10, wherein the delay determining module is further structured to detect a drift amount in the delay amount; and the timing adjusting module is further structured to adjust the commanded SOI timing to compensate for the drift amount when the drift amount exceeds a predetermined drift threshold value.

13. The engine controller of claim 7, further comprising:
a delay determining module structured to determine a delay amount between the hydraulic SOI timing and a commanded SOI timing; and
a fault indicating module structured to generate a fault indication if the delay amount exceeds a delay threshold value.

14. An internal combustion engine comprising:
a combustion chamber comprising a cylinder;
a fuel injector configured to inject fuel into the combustion chamber;
a pressure sensor configured to sense a pressure in the combustion chamber and generate pressure signals; and
an engine controller including:
a derivative calculating module structured to determine derivative values of an apparent heat release rate (AHRR) of the cylinder as a function of a crankshaft angle; and
a comparing module structured to compare the derivative values with a threshold value indicating heat loss in the cylinder and to determine a hydraulic SOI timing of the fuel injector when a derivative value from the derivative values satisfies the threshold value.

15. The internal combustion engine of claim 14, wherein the engine controller further comprises:
a pressure determining module structured to receive the pressure signals and determine combustion chamber pressure values as a function of crankshaft angle.

16. The internal combustion engine of claim 15, wherein the engine controller further comprises:
an AHRR curve data determining module structured to determine the AHRR of the cylinder based on the combustion chamber pressure values.

17. The internal combustion engine of claim 14, wherein the engine controller further comprises:
a delay determining module structured to determine a delay amount between the hydraulic SOI timing and a commanded SOI timing; and
a timing adjusting module structured to adjust the commanded SOI timing by an amount corresponding to the delay amount.

18. The internal combustion engine of claim 17, wherein the timing adjusting module adjusts the commanded SOI timing by adjusting a command timing value output from one of a fueling mapping and a table.

19. The internal combustion engine of claim 17, wherein the delay determining module is further structured to detect a drift amount in the delay amount; and the timing adjusting module is further structured to adjust the commanded SOI timing to compensate for the drift amount when the drift amount exceeds a predetermined drift threshold value.

20. The internal combustion engine of claim 14, wherein the engine controller further comprises:
a delay determining module structured to determine a delay amount between the hydraulic SOI timing and a commanded SOI timing; and
a fault indicating module structured to generate a fault indication if the delay amount exceeds a delay threshold value.

* * * * *